Oct. 27, 1970     P. E. KRUEGER ET AL     3,535,784

APPARATUS FOR CONTINUOUSLY SEPARATING CURD FINES FROM WHEY

Filed Dec. 9, 1968

Inventors
Paul E. Krueger
John A. Quee

By
Andrus, Sceales, Starke & Sawall
Attorneys

United States Patent Office 3,535,784
Patented Oct. 27, 1970

3,535,784
APPARATUS FOR CONTINUOUSLY SEPARATING CURD FINES FROM WHEY
Paul E. Krueger and John A. Quee, Madison, Wis., assignors to Dairy Equipment Company, Madison, Wis., a corporation of Wisconsin
Filed Dec. 9, 1968, Ser. No. 782,288
Int. Cl. A01j 25/00
U.S. Cl. 31—46
13 Claims

ABSTRACT OF THE DISCLOSURE

An apparatus for continuously separating curd fines from whey. The apparatus includes an accumulator tank and the whey from the cheese making vat is pumped into the tank. The tank is provided with an outlet in the lower end which is opened and closed by a weight-actuated valve, and when the weight of the whey in the tank reaches a predetermined value the valve opens and the whey is discharged to a separating unit which serves to separate the fines from the whey.

Located beneath the valve is a diffuser assembly which acts to minimize foam generation as the whey is transferred from the accumulator tank to the separator unit. The diffuser assembly includes a spherical diffuser member located beneath the valve, and spaced radially outward of the sphere is a skirt or deflector member. The whey passing through the discharge outlet of the accumulator tank engages the spherical diffuser member and is deflected outwardly against the skirt. The lower edge of the skirt is provided with a flange which serves to re-direct the whey back toward the spherical diffuser member. The diffuser assembly acts to prevent foaming of the whey as the whey is transferred to the separator unit so that the curd fines can be readily separated from the whey in the separator unit.

---

This invention relates to an apparatus for separating curd fines from whey as the whey is discharged from a cheese making vat.

In the conventional cheese making process, the whey is drained from the cheese making vat when the acid content reaches a predetermined value. The whey contains a substantial portion of curd fines and from an economical standpoint it is desirable to recover the fines so that they can be returned to the curd in the vat to thereby increase the yield. However, the fines must be separated from the whey and returned to the curd in a short period of time, generally no longer than 45 minutes, or the acidity value of the fines may change to a degree such that the fines will not reknit when returned to the curd, but instead will remain in the curd as discrete particles.

The problem of fine recovery is further complicated by the fact that the whey, when pumped from the cheese making vat, has a great tendency to foam, probably due to the high temperature and its high milk sugar content. It has been found that the fines cannot be successfully separated from the foamed whey for the fines are carried by the foam in a physical form which resists separation at the flow rates involved.

If, on the other hand, the whey is permitted to stand for a period of time sufficient to permit the foam to subside and then the separation is carried on, the separated fines cannot be returned to the curd because of the change in acidity of the fines. Therefore, in the past there has been no commercially successful method of continuously removing fines from the whey being drawn from the cheese making vat and returning the fines to the curd in the vat. The general or accepted practice in the cheese making industry has been to permit the whey to stand until foaming has subsided and then separate the fines from the whey. In this practice the fines cannot be returned to the curd, but instead must be utilized for other purposes.

The present invention is directed to an apparatus for continuously separating curd fines from whey as the whey is being discharged from the cheese making vat so that the fines can be returned to the curd to increase the yield. The apparatus, in general, includes an accumulator tank which receives the whey from the cheese making vat. The lower end of the tank defines an outlet which is enclosed by a weight-actuated valve. When the weight of the whey in the tank reaches a predetermined value, the valve opens and the whey is discharged through the discharge opening to a separator unit which serves to separate the fines from the whey.

Located beneath the discharge opening in the accumulator tank is a diffuser assembly which acts to prevent foaming of the whey as the whey is discharged to the separator unit. The diffuser assembly includes a generally spherical diffuser member or ball which is carried by the valve stem and is located directly beneath the discharge opening in the accumulator tank, so that the whey being discharged through the outlet opening in the tank will engage the peripheral surface of the ball. Located radially outward of the ball is a skirt or deflector member and the lower end of the skirt is provided with a flange which converges inwardly toward the ball. The whey striking the surface of the ball is deflected outwardly against the deflector member and the flange in turn serves to redirect the whey back toward the ball. With this construction of the diffuser assembly the whey is transferred from the accumulator tank to the separator unit with minimum foam generation so that the curd fines can be readily separated from the whey by the separator unit.

The apparatus of the invention provides a continuous recovery of up to 90% or more of the fines in the whey, and the recovered fines can be returned to the curd in the cheese making vat so that the yield is substantially increased.

The diffuser assembly minimizes foam generation at the high flow rates involved, generally in the range of 70 to 100 gallons per minute so that the fines can be readily separated from the whey by the separator unit.

As a further advantage, the fines are separated from the whey in a manner that minimizes clogging of the separator screen so that the separator can function for extended periods of time without cleaning or maintenance service.

The apparatus of the invention can be readily cleaned in place after each operation by merely introducing a washing solution into the upper end of the accumulator tank. The washing solution introduced in this manner will thoroughly clean or sanitize the entire unit without the necessity for disassembling or removing component parts.

Other objects and advantages of the invention will appears in the course of the following descriptions.

The drawings illustrate the best mode presently contemplated of carrying out the invention.

Figure 1:
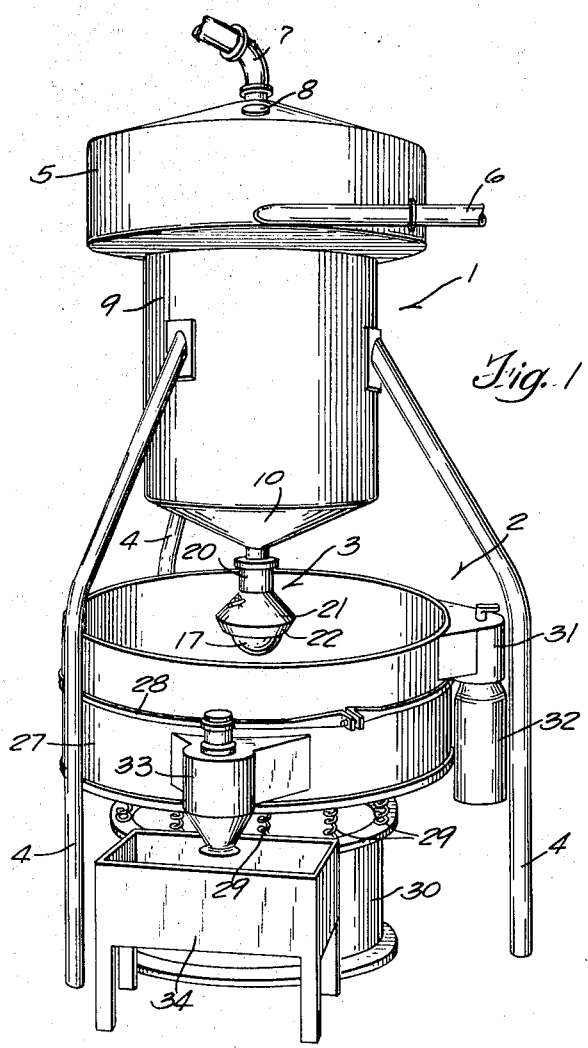
FIG. 1 is a perspective view of the apparatus of the invention.

The drawings illustrate an apparatus for continuously separating curd fines from whey as the whey is drawn from a cheese making vat. The apparatus, in general, includes an accumulator tank 1 which receives the whey from the cheese making vat and a separator unit 2 which acts to separate the fines from the whey. Located between the accumulator tank 1 and the separator tank 2 is a diffuser assembly 3 which functions to minimize the foam generation of the whey as the whey is transferred from the accumulator tank 1 to the separator unit 2.

The accumulator tank 1 is supported from a foundation by a series of legs 4, and the tank unit includes an upper section 5 having a generally tangential inlet conduit 6 through which the whey is introduced into the tank from the cheese making vat. In addition to the inlet conduit 6, a conduit 7 is connected to the upper end of the upper section 5 and during operation of the apparatus, conduit 7 serves as a vent to prevent air buildup in the accumulator tank. Conduit 7 also has a secondary function during the cleaning operation, in that cleaning solution is introduced into the apparatus through the conduit 7.

An observation port 8 is provided in the upper section 5 and enables the operator to view the contents within the tank.

The accumulator tank 1 also includes a lower section 9 having a conical bottom 10 which defines a discharge opening 11. The discharge opening 11 is enclosed by a valve 12 and the valve is urged to the closed position by a coil spring 13 which is located around the valve stem 14 and extends between the valve and a seat 15 carried by spider 16. Valve 12 is weight-actuated, meaning that the valve will open when the weight of the whey within the lower section 9 of accumulator tank 1 reaches a predetermined value necessary to overcome the force of the spring 13. Generally, the force of spring 13 is designed so that when the level of whey is approximately one-fourth of the height of the lower section 9, the valve will open to permit the whey to be discharged through the opening 11.

Figure 2:
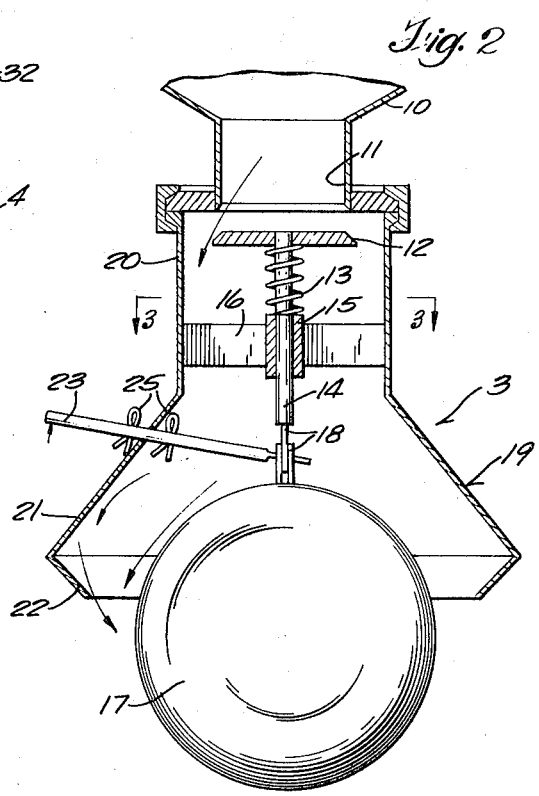
FIG. 2 is a vertical section of the valve and diffuser assembly.
Figure 3:
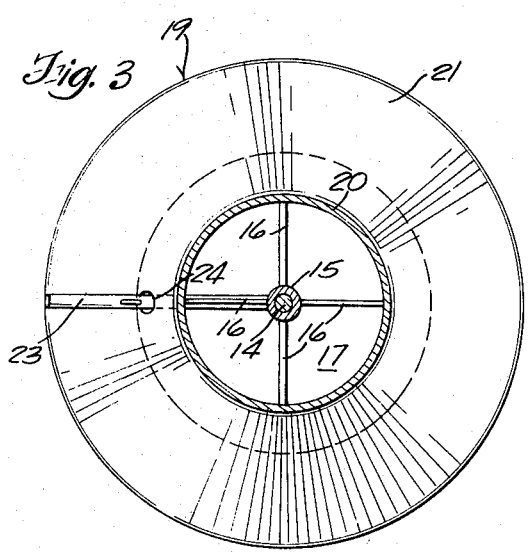
FIG. 3 is a horizontal section taken along line 3—3 of FIG. 2.

The diffuser assembly 3 includes a generally spherical diffuser member or ball 17 which is carried by valve stem 14. The lower end of the valve stem and the ball have interlocking eyes 18 so that the ball will be supported by the valve stem. The diffuser assembly 3 also includes a housing comprising a generally cylindrical upper section 20 which is located radially outward of the valve stem and serves as a support for the spider 16. The housing 19 also includes a generally frustonical skirt or deflector 21 which diverges downwardly and outwardly from the upper section 20. Connected to the lower edge of the skirt 21 is an annular flange 22 which extends at an angle of approximately 90° with respect to the skirt 21 and, as shown in FIG. 2, extends substantially tangentially to the ball 17.

The diameter of the ball 17 is greater than the diameter of the discharge opening 11 so that the whey being discharged through the opening 11 will strike the upper surface of the ball and will be deflected outwardly against the skirt 21. The flange 22 serves to redirect the whey inwardly against the lower surface of the ball. This construction provides a flow pattern for the whey which minimizes agitation and foaming.

To permit the valve 12 to be opened manually, a lever 23 is connected to the interlocked eyes 18 and extends through an opening 24 foamed in the skirt 21. Cotter pins 25 project through holes in the lever 23 and serve to retain the lever in position with respect to the skirt. By moving the outer end of lever 23 upwardly, the valve 12 will be moved downwardly to open the discharge opening so that the whey remaining in the tank 1 at the end of the operation can be drained.

The separator unit 2 is a conventional screen-type separator and in itself forms no part of the invention. The separator unit includes an open top upper section 26 and a closed lower section 27 which is separated from the upper section by screen assembly 28.

The screen assembly 28 is vibrated by a series of coil springs 29 driven by a drive unit 30. The vibrating drive is a standard type wherein the fines which are retained on the screen 28 are moved outwardly toward the periphery of the upper section 26 with a generally spiral movement and are discharged from the section 26 through an outlet 31 and collected in container 32.

The whey which passes through the screen 28 is discharged from the lower section 27 through an outlet 33 and is collected in a tank 34. A pump, not shown, can be employed to pump the whey from the tank 34 to a bulk storage location.

In operation of the unit, the whey is introduced into the upper section 5 of tank 1 through the inlet conduit 6 and due to the tangential arrangement of the inlet conduit, the whey moves downwardly along the walls of upper section 5 and lower section 9 with a swirling or spiral motion. While the swirling motion tends to minimize foam generation, the whey which accumulates in lower section 9 will, nevertheless, have a substantial foam head.

When the weight of the whey in lower section 9 reaches a predetermined value necessary to overcome the force of spring 13, the vave 12 will open to discharge the whey to the separator unit 2. As the whey is discharged from opening 11 it engages the spherical surface of ball 17 and at high flow rates, is deflected outwardly toward skirt 21. The flange 22 of skirt 21 in turn acts to redirect the whey tangentially toward the lower surface of the ball, and the whey then falls onto the screen 28 of the separator unit 2. At low flow rates the whey may merely follow the spherical contour of the ball and not be deflected into contact with the skirt 21. This construction of the diffuser assembly 3 minimizes foam development so that only a small head of foam, generally in the range of 1 to 3 inches, will develop on the screen 28.

In the separator unit 2, the curd fines are retained on screen 28 and are moved outwardly across the screen by the vibrating motion and discharged through the outlet 31 to container 32. The fines collected in container 32 can be returned to the curd in the cheese making vat.

The whey, which passes through the screen 28, is discharged through outlet 33 into tank 34 and is pumped from the tank to a storage location.

The apparatus can be cleaned in place without the removal of disassembly of component parts by merely introducing a cleaning solution into conduit 7. The solution will pass through the apparatus, thoroughly cleaning or sanitizing all components, and is collected in tank 34.

As the ball 17 is carried by valve 14, opening of the valve will change the relative position of the ball 17 with respect to the skirt 21. However, in the full open position the ball is generally lowered only about ½ inch with respect to its position when the valve is fully closed so that the flow pattern will not be affected.

The apparatus of the invention is capable of minimizing foam generation of the whey at low flow rates as well as high flow rates in the range of 70 to 100 gallons per minute. At high flow rates the annular space between the ball 17 and the skirt 21 will be substantially full of whey and yet the contour of the ball along with the cooperating contour of the skirt 21 and flange 22 will minimize foam generation so that the curd fines can be readily separated from the whey by the separator unit 2. It has been found that when using the diffuser assembly 3 only a small head of foam, generally in the range of 1 to 3 inches will be developed on the screen assembly 28 of the separator unit. Without the use of the diffuser assembly 3 and with the same flow rates, the whey would generally develop a foam head in about the range of about 30 inches, thereby making separation of the curd fines virtually impossible.

The present invention enables substantially all of the curd fines to be recovered from the whey in a continuous process so that the fines can be returned to the curd to increase the yield. The apparatus effectively minimizes foaming at both low and high flow rates, and by separating the curd fines immediately after draining the whey from the cheese making vat, the fines are in a physical form that can be readily separated and will not clog the separating screen.

As a further advantage, the unit can be cleaned in place by introducing a cleaning solution through the conduit 7 into the top of the accumulator tank. The cleaning can be accomplished without the disassembly or removal of any component parts of the unit.

I claim:

1. An apparatus for separating curd fines from whey, comprising a tank to contain the whey and having a discharge opening in the lower end, valve means to open and close said discharge opening, a diffuser member located beneath the discharge opening, the upper portion of the diffuser member being a portion of the sphere and said upper portion having a diameter greater than the diameter of said discharge opening whereby the whey being discharged through the opening will strike the upper portion of said diffuser member, a deflector member located radially outward of said diffuser member, and separator means located beneath the diffuser member to receive the whey and separate the fines from the whey.

2. The apparatus of claim 1, wherein said deflector member has a generally frusto-conical shape and extends downwardly and outwardly.

3. The apparatus of claim 2, and including a flange connected to the lower end of said frusto-conical deflector member, said flange extending inwardly toward the axis of said discharge opening and at an angle to said deflector member.

4. The apparatus of claim 3, wherein said flange extends at an angle of approximately 90° with respect to said frusto-conical section.

5. The apparatus of claim 3, wherein said flange extends generally tangentially to the surface of the diffuser member.

6. The apparatus of claim 1, wherein said separator member includes an open top upper section located beneath said diffuser member, a lower section, and a screen assembly separating said upper section and said lower section, said diffuser member being spaced above the screen and said screen acting to separate the curd fines from the whey.

7. The apparatus of claim 6, and including means for discharging the fines from the upper section.

8. The apparatus of claim 6, and including means for vibrating the screen with a motion to move the fines toward the periphery of the screen for discharge.

9. An apparatus for separating curd fines from whey as the whey is discharged from a cheese making vat, comprising a tank having an inlet opening to receive whey from the cheese making vat and having a discharge opening in the lower end, valve means for opening and closing said discharge opening, a generally spherical diffuser member located beneath the discharge opening with the diameter of said diffuser member being greater than the diameter of the discharge opening whereby the whey being discharged through said opening will engage the periphery of said diffuser member, an annular deflector member located radially outward of said diffuser member and extending downwardly and outwardly, a flange connected to the lower end of the deflector member and extending downwardly and inwardly, said whey being deflected outwardly from said diffuser member toward said deflector member and said flange redirecting the whey back towards said diffuser member, and separator means located beneath the diffuser member for separating the fines from the whey.

10. The apparatus of claim 9, wherein said diffuser member is operably connected to said valve means.

11. The apparatus of claim 9, wherein said valve means includes a downwardly extending valve stem and said diffuser member is connected to said valve means so that said diffuser member is movable with said valve means.

12. The apparatus of claim 9, and including means responsive to a given weight of whey in said tank for opening said valve means.

13. The apparatus of claim 9, and including manual operating means connected to said valve means for manually opening and closing said valve means.

References Cited

UNITED STATES PATENTS

| 3,193,927 | 7/1965 | Ubbels et al. | 31—46 |
| 3,227,139 | 1/1966 | Gass et al. | 119—17 |

ALDRICH F. MEDBERY, Primary Examiner

U.S. Cl. X.R.

99—116; 209—117